Figure 1:
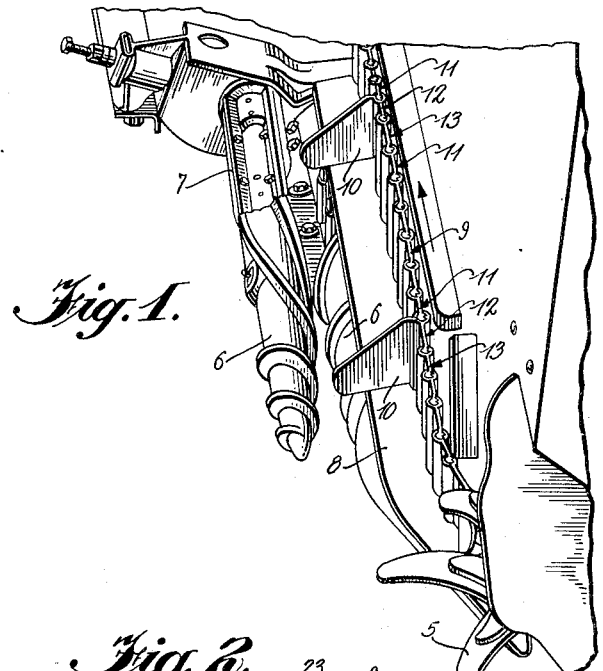

Oct. 31, 1950 J. K. KORRA 2,527,938
CARRIER CHAIN
Filed July 7, 1948

INVENTOR.
John K. Korra
BY
L. Donald Mylotte
ATTORNEY

Patented Oct. 31, 1950

2,527,938

UNITED STATES PATENT OFFICE 2,527,938

CARRIER CHAIN

John K. Korra, Indianapolis, Ind., assignor to Link-Belt Company, a corporation of Illinois Application July 7, 1948, Serial No. 37,457

5 Claims. (Cl. 198—176)

1

This invention relates to new and useful improvements in carrier chains for use in conjunction with the gathering units of corn-picking implements and the like.

Chains of this type are commonly composed of a series of detachable links so that broken links may be easily replaced and the length of the chain varied at will. The gathering links of the chain are provided with flights that extend from one face of each link and serve to receive the stalks and guide them into the gathering unit. These gathering links are normally uniformly spaced at predetermined intervals, but this spacing may vary according to the demand of particular circumstances.

In operation the chain follows a continuous path around a pair of terminal sprockets with the axes of the link joints in vertical or near vertical planes. It is supported throughout its active run by a guide plate or slide upon which the lower edge of the chain rests.

In practice, it has been found that due to the retarding action of the corn-stalks or other obstructions against the flights of the gathering links, these links are sometimes caused to swing away from the pitch line of the chain. When this occurs, the displaced gathering link and the next following link are sometimes placed in the conventional position for detachability.

It has also been found that trash sometimes collects along the surface upon which the chain rests causing the links to lift and drop as they pass over the trash. Also, when the retarding action, previously described, occurs under circumstances in which the retarding corn-stalks or other body exerts an upward force, the chain may be lifted from its supporting surface.

Under certain circumstances, a gathering link may be retarded, to place it in the displaced position for detachability, described above, and at the same time, the next following link may be lifted by trash, or the gathering link may be lifted by the retarding corn-stalk. In either case, the two links are partially detached, due to their relative movement, and are thereby locked against action of their connecting joint.

When the two partially detached and locked links reach the terminal sprocket where it is necessary for the links to move relative to each other, their locked condition results in breakage or serious damage to the links. It has been found in actual operation that the conditions described above and the resulting failure of the chain may occur several times during the picking of an acre of corn.

2

Because of the fact that breakage might result from the above referred to relative movement between the gathering link and the next following link, and because of the desirability of retaining the detachable connections between adjacent links in this type of chain, the problem of developing a satisfactory type chain, with a minimum change in design, tools and machinery for manufacture, has been difficult.

It is, then, a primary object of the invention to provide a carrier chain having non-detachable joints between the gathering links and the next following links, and detachable joints between all the other links of the chain.

A further object of the invention is to provide a non-detachable joint between each gathering link and the next following link of a carrier chain while retaining the detachability of the connections between the outer ends of these links and their next adjacent links.

A further object of the invention is to provide a gathering link and a plain link connected by a non-detachable, articulating joint, and adapted to be detachably connected to standard links at both of the free end portions.

Other objects and advantages of the invention will be apparent during the course of the following description.

Figure 2:
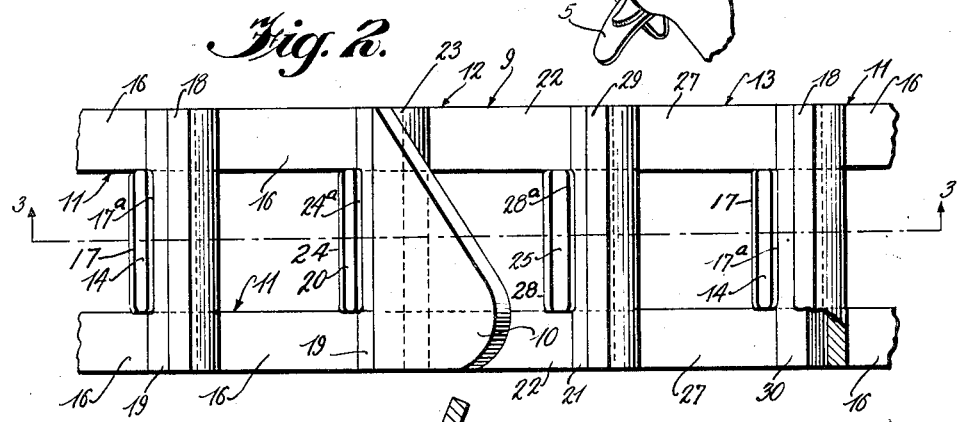
Figure 3:
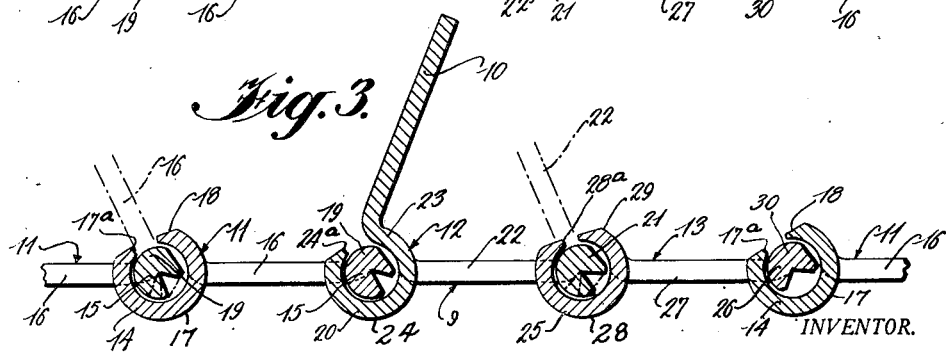

In the accompanying drawings, forming a part of this application, and in which like numerals are employed to designate like parts throughout the same, Figure 1 is a fragmentary perspective view of a portion of a corn-picking device wherein is employed the embodiment of this invention, Figure 2 is an elevational view of a section of a carrier chain embodying this invention, and Figure 3 is a sectional view taken on line 3—3 of Fig. 2.

In the drawings, wherein for the purpose of illustration is shown the preferred embodiment of the invention, and first particularly referring to Fig. 1, wherein there is illustrated a portion of a corn-picking device incorporating the invention, reference character 5 designates a gathering spider which is followed in operative sequence by the tapered gathering roll sections 6 and the snapping roll sections 7. A guide plate 8 is connected to the frame of the device for supporting the continuous carrier chain 9 through its illustrated active run. The gathering flights 10 of the chain 9 serve to receive the stalks of corn from the spider 5, to convey them into the tapered gathering roll sections 6 and the snapping roll sections 7.

Referring now to Figs. 2 and 3 for a detailed description, the carrier chain 9 is composed of plain links 11, and equally spaced pitches of gathering links 12 which are connected to the next following plain links by the special links 13.

The plain links 11 each consists of a hook end 14 and a pintle end 15 connected by a pair of side bars 16. The hook end 14 consists of a tongue 17 and a shank 18. The tongue 17 is formed from a portion of the link blank taken from between the side bars 16 and curled so that its end 17a lies in spaced relation to the shank 18. This shank forms a cross-bar to connect the side bars 16 at the hook end 14 of the link 11.

The pintle end 15 is formed from a portion of the link blank taken from between the side bars 16 and curled so as to cooperate with the cross-bar 19 to form a substantially cylindrical pintle. The cross-bar 19 connects the side bars 16 at the pintle end 15 of the link.

The physical relationship between the hook end 14 and the pintle end 15 is such that the outer diameter of the pintle is slightly less than the inner diameter of the hook bore, and the space between the end 17a of the tongue 17 and the projected shank 18 is so dimensioned relative to the thickness of the side bars 16 as to enable the side bars to be passed through the space.

The plain links 11, therefore, may be detachably assembled by connection of the pintle ends 15 and hook ends 14 in the manner hereafter described.

As illustrated in the broken line showing of the side bars 16 of a plain link in Fig. 3, the axes of a pintle end 15 and bore of a hook end 14 to be connected are placed in alinement so that the side bars 16 extending from the pintle are in radial alinement with the space between the end 17a of the tongue 17 and the shank 18. The hook end 14 and pintle end 15 are then moved laterally along their common axis until the side bars 16 of both are longitudinally alined at which point rotation of the side bars completes the assembly.

When thus assembled, the tongue 17 lies between the side bars 16 connected to the pintle end 15 to prevent relative lateral movement between the links 11, and the links can be disassembled only when the above mentioned position of radial alinement is reestablished.

The gathering links 12 each consists of a hook end 20 and pintle end 21, identical to the hook end 14 and pintle end 15, connected by side bars 22, and a flight 10 which is formed by the extension of the shank 23 in angular relation to the side bars 22. The spaced relation of the end 24a of the tongue 24 and the shank 23 is similar to that of the plain links 11, and assembly of the hook end 20 and the pintle end 15 of a plain link is identical to that of two plain links above described.

The special links 13 are each composed of a hook end 25 and a pintle end 26 connected by a pair of side bars 27. The hook end 25 consists of a tongue 28 and a shank 29. The tongue 28 is formed by curling a portion taken from between the side bars 27 of the link blank around the pintle end 21 of a gathering link 12. The portion of the link blank so curled is made sufficiently long to substantially enclose the pintle end 21 or so that the space between the end 28a of the tongue 28 and the shank 29 is so dimensioned relative to the thickness of the side bars 22 of the gathering link as to prevent the side bars from being passed through the space.

The pintle end 26 is formed by curling the remaining portion of the link blank between the side bars 27 so that it cooperates with the cross-bar 30 to form a substantially cylindrical pintle. Due to the length of the tongue 28, the portion of the link blank remaining between the side bars 27 after the tongue is formed is somewhat shorter than that of the plain links 11. The difference between the pintle ends 26 of the special links and the pintle ends 15 of the plain links is, however, insufficient to prevent their having the same characteristics insofar as joint action and assembly and disassembly are concerned. The assembly of the pintle end 26 of a special link and a hook end 14 of a plain link is identical to that discussed with regard to assembly of plain links 11.

The tongue 28 of each special link 13 being curled around the pintle end 21 of a gathering link 12 in the manner described above, these links are non-detachably assembled to form a two-link gathering subassembly. The non-detachable nature of the assembly results from the length of the tongue 28 being such that regardless of the relative position of the two links, the tongue 28 will always lie between the side bars 22 of the gathering link to prevent relative lateral movement between the links, see the broken line showing of the side bars 22 of the gathering link in Fig. 3.

The end 20 and pintle end 26 of each gathering subassembly cooperate with the pintle end 15 and hook end 14, respectively, of their adjacent plain links 11 for detachable assembly as hereinbefore described, so that successive gathering assemblies are detachably connected by equal numbers of plain links.

When assembled as described above and located as illustrated in Fig. 1, the carrier chain 9 functions during operation of the corn-picking device to receive and convey the stalks of corn. Certain stalks of corn, or other encountered objects, may resist the conveying function by exerting a sufficient retarding force on the flights 10 of the chain to cause the gathering links 12 to swing out or away from the pitch line of the chain as illustrated by the broken line showing of the side bars 22 in Fig. 3.

If, by way of illustration, the spaces between the ends 28a of the tongues 28 and the shanks 29 of the special links were the same as those between the ends 17a of the tongues and the shanks 18 of the plain links, any sufficient upward force acting on the bottom surface of a flight 10, a gathering link 12 or a special link 13, when the links 12 and 13 are in the aforesaid displaced position, would result in relative vertical or detaching movement between the links. This movement would place one of the side bars 22 within the space between the end 28a of the tongues 28 and the shank 29 and would thereby lock the links against relative movement. Since it is necessary for adjacent links to pivot when traveling around the terminal sprockets, a locked condition at any chain joint would result in serious damage or breakage of the links.

It will be appreciated that the conditions recited in the above illustration are not applicable to the invention since the permanent type connections between the gathering links 12 and the special links 13 prevent relative vertical movement between the links under any circumstances.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. An endless carrier chain, comprising a plurality of spaced sections of standard links with a gathering link and a special link positioned between each of the adjacent sections of standard links, each of the aforesaid links having a pair of side bars joined by a pintle end and a hook end, with the hook ends of all of said links having substantially equal bore diameters, all of the standard and gathering links having their hook ends detachably connected to the pintle ends of their next adjacent links, and each of said special links having its hook end substantially enclosing the pintle end of the adjacent gathering link to provide a non-detachable connection therebetween.

2. In a carrier chain, the improvement which comprises, a gathering link and a special link, each of the aforesaid links having a pair of side bars joined by a hook end and a pintle end, with the hook ends of both of the links having substantially equal bore diameters, said special link having its hook end substantially enclosing the pintle end of the gathering link to provide a non-detachable connection therebetween, and the hook end of said gathering link and the pintle end of said special link being adapted to form complemental parts of detachable hook and pintle connections with adjacent links of a chain.

3. An endless carrier chain, comprising a plurality of spaced sections of standard links with a gathering link and a special link positioned between each of the adjacent sections of standard links, each of the aforesaid links having a pair of side bars joined by a hook end and a pintle end, all of the standard and gathering links having their hook ends detachably connected to the pintle ends of their next adjacent links, each of said special links having its hook end non-detachably connected to the pintle end of the adjacent gathering link, the hook end of each one of said links being formed by a shank portion and by a tongue portion formed of the material from between the side bars which is curled to a position in which its end is spaced from its associated shank portion, the tongue portion of each standard and gathering link being of such length that the space formed between it and its associated shank portion will be wide enough to produce an aforesaid detachable connection by allowing a link side bar to pass therethrough, and the tongue portion of each of the special links being of such greater length than the tongue portions of the standard and gathering links that the space formed between it and its associated shank portions will be so narrow as to produce an aforesaid non-detachable connection by preventing a link side bar from passing therethrough.

4. In a carrier chain, the improvement which comprises a gathering link and a special link, each of the aforesaid links having a pair of side bars joined by a hook end and a pintle end, said special link having its hook end non-detachably connected to the pintle end of the gathering link, the hook end of each of said links being formed by a shank portion and by a tongue portion formed of the material from between the side bars which is curled to a position in which its end is spaced from its associated shank portion, the tongue portion of said gathering link being of such length that the space formed between it and its associated shank portion will be wide enough to produce a detachable connection by allowing a link side bar to pass therethrough, and the tongue portion of said special link being of such greater length than the tongue portion of the gathering link that the space formed between it and its associated shank portion will be so narrow as to produce the aforesaid non-detachable connection by preventing the side bar of the gathering link from passing therethrough.

5. An endless carrier chain, comprising a plurality of spaced sections of a like number of standard links with a gathering link and a special link positioned between adjacent sections of standard links, each of the aforesaid links having a pintle end and a hook end having a tongue, all of the standard and gathering links having their hook ends detachably connected to the pintle ends of their next adjacent links, and each of said special links having the tongue of its hook end of greater length than the tongues of the hook ends of said other links whereby the hook end of said special link is non-detachably connected to the pintle end of the adjacent gathering link.

JOHN K. KORRA.

REFERENCES CITED

The following references are of record in the file of this patent:

UNITED STATES PATENTS

| Number | Name | Date |
|---|---|---|
| 280,729 | Ewart | July 3, 1883 |
| 1,087,905 | Horn | Feb. 17, 1914 |
| 1,638,267 | Morehead | Aug. 9, 1927 |